United States Patent
Lu et al.

(10) Patent No.: US 9,182,967 B2
(45) Date of Patent: Nov. 10, 2015

(54) METHOD FOR SAFELY DOWNLOADING APPLICATION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/390,045

(22) PCT Filed: Oct. 21, 2013

(86) PCT No.: PCT/CN2013/085603
§ 371 (c)(1),
(2) Date: Oct. 2, 2014

(87) PCT Pub. No.: WO2014/067406
PCT Pub. Date: May 8, 2014

(65) Prior Publication Data
US 2015/0227353 A1  Aug. 13, 2015

(30) Foreign Application Priority Data
Oct. 31, 2012  (CN) .......................... 2012 1 0429244

(51) Int. Cl.
| | |
|---|---|
| *G06F 9/445* | (2006.01) |
| *G06F 21/51* | (2013.01) |
| *H04W 12/00* | (2009.01) |
| *G06F 11/07* | (2006.01) |
| *H04L 29/06* | (2006.01) |
| *H04L 9/06* | (2006.01) |

(52) U.S. Cl.
CPC .............. *G06F 8/61* (2013.01); *G06F 11/0793* (2013.01); *G06F 21/51* (2013.01); *H04L 63/0428* (2013.01); *H04W 12/00* (2013.01); *H04L 9/0637* (2013.01)

(58) Field of Classification Search
CPC ............................... G06F 8/61; G06F 11/0793
USPC ............................ 713/168, 178, 181; 726/22
See application file for complete search history.

(56) References Cited

U.S. PATENT DOCUMENTS

| | | | | |
|---|---|---|---|---|
| 7,434,259 | B2 * | 10/2008 | Hofmeister | ............. G06F 21/51 713/164 |
| 2003/0204730 | A1 * | 10/2003 | Barmettler | ............. H04L 29/06 713/181 |
| 2011/0202913 | A1 * | 8/2011 | Nishimura | ............. G06F 21/10 717/178 |
| 2012/0203862 | A1 |  8/2012 | Tayeb et al. | |

OTHER PUBLICATIONS

Kiely, "Key way to Secure ASP.net Applications with a SQL Server", Dec. 2011, SQL Server Magazine, p. 27-31.*

* cited by examiner

*Primary Examiner* — Kenneth Chang
*Assistant Examiner* — Gregory Lane
(74) *Attorney, Agent, or Firm* — Hammer & Associates, P.C.

(57) ABSTRACT

A method for safely downloading an application, including: after a successful mutual authentication of a card and a card connector, adopting an all-cipher text communication means, and controlling the number of installations of an application by a card activation operation, so as to realize secure downloading of the application. The present invention realizes all-cipher text communication of a card and a card connector, and the issuing frequency of the card is controllable; by means of such a method, the independence and security of the application can be ensured when issuing a card, while the issuing frequency of the card is limited, intermediaries and clients are prevented from arbitrarily downloading an application, and the security is relatively high.

29 Claims, 5 Drawing Sheets

METHOD FOR SAFELY DOWNLOADING APPLICATION

TECHNICAL FIELD

The present invention relates to smart card field, and in particular relates to a method for safely downloading an application.

PRIOR ART

When downloading an application, the inventor finds the following shortcomings in the prior art that all problems of management on applications of a card are taken responsibility by a card provider after the card provider installs applications in the card; a safety problem resulted from exposing confidential data set by the card provider to the outside after the card provider sends one or more application packets of its card to a customer or to an outside plant for processing; and a security problem is incurred by once by providing and more times of repeatedly using due to uncontrolled times of installation of the application of the card.

SUMMARY OF THE INVENTION

The object of the present invention is to provide a method for safely downloading an application, in which, the application is ensured to be independent and secure in case of issuing a card and the card issuing times is limited so as to prevent an intermediary or a customer from arbitrarily downloading the application, so as to have a high security.

Thus, according to one aspect of the present invention, there is provided a method for safely downloading an application, characterized in that said method comprises:

Step S1, executing an instruction of request for installing an application, and determining whether a first instruction is received successfully by a card connector, if yes, going to Step S2; otherwise, outputting error information and quitting the installation;

Step S2, sending the first instruction to a card by the card connector;

Step S3, receiving the first instruction and reading a first computing result of the first instruction from the first instruction by the card, comparing the first computing result of the first instruction with a second computing result of the first instruction computed by the first instruction, if they are identical, sending a first success response status code to the card connector and going to Step S4 by the card; if they are not identical, sending a first failure response status code to the card connector, and then quitting the installation by the card;

Step S4, determining whether a next first instruction is read successfully by the card connector, if yes, going back to Step S2; otherwise, going to Step S5;

Step S5, determining whether a second instruction is read successfully by the card connector, if yes, going to Step S6; otherwise, outputting error information and quitting the installation;

Step S6, sending the second instruction to the card by the card connector;

Step S7, receiving the second instruction and reading a first computing result of the second instruction from the second instruction, and comparing the first computing result of the second instruction with a second computing result of the second instruction computed by the second instruction, by the card, if they are identical, sending a second success response status code to the card connector, and going to Step S8; while if they are not identical, sending a second failure response status code to the card connector and quitting the installation;

Step S8, determining whether a next second instruction is read successfully by the card connector, if yes, returning to Step S6; otherwise, going to Step S9;

Step S9, determining whether a third instruction is read successfully by the card connector, if yes, going to Step S10; otherwise, outputting error information and quitting the installation;

Step S10, sending a third instruction to the card by the card connector;

Step S11, receiving the third instruction, reading a first computing result of the third instruction, and comparing the first computing result of the third instruction with a second computing result of the third instruction computed by the third instruction, by the card; if they are identical, sending a third success response status code to the card connector and going to Step S12; while if they are not identical, sending a third failure response status code to the card connector and quitting the installation;

Step S12, determining whether a next third instruction is read successfully by the card connector, if yes, returning to Step S10; otherwise, going to Step S13;

Step S13, determining whether an activating instruction is executed successfully by the card connector, if yes, going to Step S14; otherwise, quitting the installation;

Step S14, determining whether a fourth instruction is read successfully by the card connector, if yes, going to Step S15; otherwise, quitting the installation;

Step S15, sending the fourth instruction to the card by the card connector;

Step S16, receiving the fourth instruction, executing a corresponding operation, and sending a fourth response status code to the card connector by the card; and Step S17, determining whether the fourth response status code is identical to a preset value by the card connector, if yes, sending an application to the card; while if no, quitting the installation.

Preferably, before Step S1, the method comprises:

Step A1, generating a host inquiring code and storing the host inquiring code by the card connector, sending an internally initializing instruction including the host inquiring code to the card by the card connector;

Step A2, receiving the internally initializing instruction and reading the host inquiring code from the internally initializing instruction by the card, generating and storing a card inquiring code, a first session key and a second session key by the card, generating a first data block with the host inquiring code, a serial counting value and the card inquiring code, and encrypting the first data block with the first session key, so as to obtain a first encryption result by the card; sending an internal initialization response including the first encryption result, the card inquiring code and the serial counting value to the card connector by the card;

Step A3, receiving the internal initialization response and reading the first encryption result, the card inquiring code, and the serial counting value from the internally initializing instruction by the card connector, executing an authenticating instruction including the internal initialization response by the card connector, generating a third session key and a fourth session key and storing the third session key and the fourth session key by the card connector, generating a second data block with the host inquiring code, the serial counting value and the card inquiring code by the card connector; encrypting the second data block with the third session key so as to obtain a second encryption result, and comparing the second encryption result with the first encryption result by the card connector, if they are identical, going to Step A4; while if they are not identical, outputting error information, and quitting the installation;

Step A4, generating a third data block with the host inquiring code, the serial counting value and the card inquiring code by the card connector; encrypting the third data block with the third session key so as to obtain a third encryption result by the card connector; taking the third encryption result as a part of the authentication data, and computing the authentication data with the fourth session key and a card connector information value so as to obtain a card connector computing result by the card connector; sending an external authenticating instruction including the authentication data and the card connector computing result to the card by the card connector;

Step A5, receiving the external authenticating instruction and reading the authentication data and the card connector computing result from the external authenticating instruction by the card; reading a third encryption result from the authentication data, generating a fourth data block with the host inquiring code, the serial counting value and the card inquiring code by the card connector, encrypting the fourth data block with the first session key so as to obtain a fourth encryption result, and comparing the fourth encryption result with the third encryption result by the card; if they are identical, going to Step A6; while if they are not identical, sending error information and quitting the installation;

Step A6, computing the authentication data with the second session key and a card information value and comparing the obtained card computing result with the card connector computing result by the card, if they are identical, sending an external authentication success response to the card connector by the card and going to Step A7; while if they are not identical, sending error information and quitting the installation; and Step A7, determining whether the application requested for installation is available, if yes, going to Step S1; otherwise, quitting the installation.

Preferably, generating a first session key in Step A2 comprises:

generating a first derivative data with the serial counting value, a first constant and a preset constant, and encrypting the first derivative data with a built-in first key by a specified method so as to generate the first session key by the card;

generating a second session key by the card comprises: generating a second derivative data with the serial counting value, a second constant and the preset constant, and encrypting the second derivative data with a built-in second key by a specified method, so as to generate the second session key by the card;

generating a first data block with the host inquiring code, the serial counting value and the card inquiring code comprises: converging the host inquiring code, the serial counting value, the card inquiring code and the first constant one by one so as to obtain the first data block; and encrypting the first data block with the first session key comprises: encrypting the first data block with the first session key by a specified method.

Preferably, authenticating instruction in Step A3 comprises: an instruction, which is constructed by the card connector, including the internal initialization response and taking specified bytes as a data header;

generating a third session key comprises: generating a third derivative data with the serial counting value, the first constant and the preset constant, and encrypting the third derivative data with the built-in first key by a specified method so as to generate the third session key by the card connector;

generating a fourth session key by the card connector comprises: generating a fourth derivative data with the serial counting value, a second constant and the preset constant, and encrypting the fourth derivative data with a built-in second key by a specified method so as to obtain the fourth session key, by the card connector;

generating a second data block with the host inquiring code, the serial counting value and the card inquiring code comprises: converging the host inquiring code, the serial counting value, the card inquiring code and a first variable one by one so as to obtain the second data block; and encrypting the second data block with a third session key comprises: encrypting the second data block with the third session key by a specified method.

Preferably, generating a third data block with the host inquiring code, the serial counting value and the card inquiring code by the card connector in Step A4 comprises: converging the serial counting value, the card inquiring code, the host inquiring code and the first variable one by one so as to obtain the third data block; and encrypting the third data block with the third session key comprises: encrypting the third data block with the third session key by a specified method.

Preferably, generating a fourth data block with the host inquiring code, the serial counting value and the card inquiring code by the card in Step A5 comprises: converging the serial counting value, the card inquiring code, the host inquiring code and the first variable one by one so as to obtain the fourth data block; and encrypting the fourth data block with the first session key comprises: encrypting the fourth data block with the first session key by a specified method.

Preferably, determining whether the application requested for installation is available by the card connector in Step A7 comprises: determining whether the application requested for installation is available according to a specified character in the instruction of request for installing an application by the card connector.

Preferably, the first instruction in Step S1 is the first instruction pointed to by a first operation instruction.

Preferably, reading the first instruction comprises: computing the first instruction with the fourth session key and the card connector information value so as to obtain the first computing result of the first instruction, and adding the first computing result of the first instruction to the right side of the first instruction so as to form a new first instruction; encrypting a data field of the first instruction with the third session key by a specified method, replacing an original part of the data field of the first instruction with an encrypted result so as to obtain a final first instruction.

Preferably, reading the first computing result of the first instruction and comparing the first computing result of the first instruction with the second computing result of the first instruction by the card in Step S3 comprises: reading the last 8 bytes of the first instruction so as to obtain the first computing result of the first instruction, decrypting a data field of the first instruction with the first session key by a specified method, replacing the original part of the data field of the first instruction with the encrypted result, computing a specified part of the first instruction with the second session key and the card information value so as to obtain the second computing result of the first instruction, and comparing the first computing result of the first instruction with the second computing result of the first instruction.

Preferably, before Step S5, the method comprises determining whether a first file pointed to by a second operation instruction is available, if yes, going to Step S5; otherwise, outputting error information and quitting the installation.

Preferably, the second instruction in Step S5 is the second instruction pointed to by the first file and a third operation instruction.

Preferably, reading the second instruction comprises computing the second instruction with the fourth session key and the card connector information value so as to obtain the first computing result of the second instruction, adding the first computing result of the second instruction to the right side of the second instruction so as to form a new second instruction, encrypting a data field of the second instruction with the third session key by a specified method, and replacing the original part of the data field of the second instruction with the encrypted result so as to obtain a final second instruction.

Preferably, reading a first computing result of the second instruction from the second instruction, and comparing the first computing result of the second instruction with a second computing result of the second instruction by the card comprises reading the last 8 bytes of the second instruction so as to obtain the first computing result of the second instruction, decrypting a data field of the second instruction with the first session key by a specified method, replacing the original part of the data field of the second instruction with the decrypted result, computing a specified part of the second instruction with the second session key and the card information value so as to obtain the second computing result of the second instruction, and comparing the first computing result of the second instruction with the second computing result of the second instruction.

Preferably, before Step S9, the method further comprises determining whether a second file pointed to by a fourth operation instruction is available by the card connector, if yes, going to Step S9; otherwise, outputting error information and quitting the installation.

Preferably, the third instruction in Step S9 is a third instruction pointed to by a second file and a fifth operation instruction.

Preferably, reading the third instruction comprises computing the third instruction with the fourth session key and the card connector information value so as to obtain the first computing result of the third instruction, adding the first computing result of the third instruction to the right side of the third instruction so as to form a new third instruction, encrypting a data field of the third instruction with the third session key by specified method, and replacing the original part with the encrypted result so as to obtain a final third instruction.

Preferably, reading a first computing result of the third instruction and comparing the first computing result of the third instruction with a second computing result of the third instruction computed by the third instruction by the card in Step S11 comprises reading the last 8 bytes of the third instruction so as to obtain the first computing result of the third instruction, decrypting a data field of the third instruction with the first session key by a specified method, replacing the original part with the decrypted result, computing a specified part of the third instruction with the second session key and the card information value so as to obtain the second computing result of the third instruction, and comparing the first computing result of the third instruction with the second computing result of the third instruction.

Preferably, before Step S13, the method comprises determining whether a next first file pointed to by the second operation instruction by the card connector is available, if the next first file pointed to by the second operation instruction by the card connector is available, if yes, returning to Step S5; otherwise, going to Step S13.

Preferably, determining whether an activating instruction is executed successfully by the card connector in Step S13 comprises determining whether the times of the available activation is larger than 0, if yes, executing the activation operation and deducting 1 from the times of available activation; otherwise, quitting the installation.

According to another aspect of the present invention, there is provided method of safely downloading an application, characterized in that said method comprises:

Step B1, receiving an instruction and determining the type of the instruction by the card;

if the instruction is an internally initializing instruction, going to Step B2;

if the instruction is an external authenticating instruction, going to Step B3;

if the instruction is a first instruction, going to Step B5;

if the instruction is a second instruction, going to Step B6;

if the instruction is a third instruction, going to Step B7;

if the instruction is another instruction, executing a corresponding operation according to the another instruction and returning to Step B1;

Step B2, reading a host inquiring code from the internally initializing instruction by the card, generating and storing a card inquiring code, a first session key and a second session key, generating a first data block, encrypting the first data block so as to obtain a first encryption result by the card, and sending an internal initialization response to the card connector and returning to Step B1;

Step B3, reading an authentication data and a card connector computing result from the external authenticating instruction by the card, reading a third encryption result from the authentication data, generating a fourth data block by the card, encrypting a fourth data block so as to obtain a fourth encryption result, and comparing the fourth encryption result with the third encryption result by the card, if they are identical, going to Step B4; while if they are not identical, sending error information to the card connector and going to Step B1;

Step B4, computing the authentication data by the card so as to obtain a card computing result, comparing the card computing result with the card connector computing result by the card, if they are identical, sending an external authentication success response status code to the card connector and returning to Step B1; while if they are not identical, sending an external authentication failure response status code to the card connector and returning to Step B1;

Step B5, reading a first computing result of the first instruction from the first instruction by the card, decrypting the first instruction, replacing the original part with the decrypted result, computing the first instruction so as to obtain a second computing result of the first instruction by the card, comparing the second computing result of the first instruction with the first computing result of the first instruction by the card, if they are identical, sending a first success response status code to the card connector and returning to Step B1; while if they are not identical, sending a first failure response status code to the card connector and returning to Step B1;

Step B6, reading a first computing result of the second instruction from the second instruction by the card, decrypting the second instruction, replacing the original part with the decrypted result, computing the second instruction so as to obtain a second computing result of the second instruction, and comparing the second computing result of the second instruction with the first computing result of the second instruction, if they are identical, sending a second success response status code to the card connector and returning to Step B1, while if they are not identical, sending a second failure response status code to the card connector and returning to Step B1; and Step B7, reading a first computing result of the third instruction from the third instruction, decrypting the third instruction, replacing the original part with the decrypted result, computing the third instruction so as to obtain a second computing result of the third instruction, and comparing the second computing result of the third instruction with the first computing result of the third instruction, if they are identical, sending a third success response status code to the card connector and returning to Step B1; while if they are not identical, sending a third failure response status code to the card connector and returning to Step B1.

Preferably, generating a first session key in Step B2 comprises generating a first derivative data with a serial counting value, a first constant and a preset constant and encrypting the first derivative data with a built-in first key by a specified method so as to obtain the first session key by the card;

generating a second session key by the card comprises generating a second derivative data with a serial counting value, a second constant and a preset constant, encrypting the second derivative data with a built-in second key by a specified method by the card so as to obtain the second session key;

generating a first data block comprises converging the host inquiring code, the serial counting value, the card inquiring code and a first variable one by one so as to obtain the first data block;

encrypting the first data block comprises encrypting the first data block with the first session key by a specified method; and the internal initialization response sent to the card connector is an internal initialization response including the first encryption result, the card inquiring code and the serial counting value.

Preferably, generating a fourth data block in Step B3 comprises converging the serial counting value, the card inquiring code, the host inquiring code and the first variable one by one so as to form the fourth data block;

encrypting the fourth data block comprises encrypting the fourth data block with the first session key by a specified method.

Preferably, computing the authentication data in Step B4 comprises computing the authentication data with the second session key and the card information value by the card.

Preferably, decrypting in Step B5 or Step B6 or Step B7 comprises decrypting a data field of the instruction with the first session key in a specified method by the card; and computing the instruction comprises computing a specified part of the instruction with the second session key and the card information value.

According to another aspect of the present invention, there is provided method for safely downloading an application, characterized in that said method comprises:

Step C1, waiting for receiving an internally initializing instruction and determining whether the internally initializing instruction is received by a card, if yes, going to Step C2; otherwise, returning to Step C1;

Step C2, reading a host inquiring code from the internally initializing instruction by the card, generating a card inquiring code, a first session key and a second session key so as to obtain a first data block by the card, encrypting the first data block so as to obtain a first encryption result, and sending the internally initializing response to the card connector by the card, and going to Step C3;

Step C3, waiting for receiving an external authenticating instruction and determining whether the external authenticating instruction is received by the card, if yes, going to Step C4; otherwise, returning to Step C3;

Step C4, reading the authentication data and a card connector computing result from the external authenticating instruction by the card, reading a third encryption result from the authentication data so as to obtain a fourth data block by the card, encrypting the fourth data block so as to obtain a fourth encryption result, and comparing the fourth encryption result with the third encryption result by the card, if they are identical, going to Step C5; while if they are not identical, sending error information to the card connector;

Step C5, computing the authentication data so as to obtain a card computing result by the card, comparing the card computing result with the card connector computing result, if they are identical, sending an external authentication success response status code to the card connector and going to Step C6; while if they are not identical, sending an external authentication failure response status code to the card connector;

Step C6, waiting for receiving a first instruction, and determining whether the first instruction is received by the card, if yes, going to Step C7; otherwise, returning to Step C6;

Step C7, reading a first computing result of the first instruction from the first instruction by the card, decrypting the first instruction, replacing the original part with the decrypted result by the card, computing the first instruction so as to obtain a second computing result of the first instruction, and comparing the second computing result of the first instruction with the first computing result of the first instruction by the card, if they are identical, sending a first success response status code to the card connector and going to Step C8; while if they are not identical, sending a first failure response status code to the card connector;

Step C8, waiting for receiving a second instruction, and determining whether the second instruction is received by the card, if yes, going to Step C9; otherwise, returning to Step C8;

Step C9, reading a first computing result of the second instruction from the second instruction by the card, decrypting the second instruction, replacing the original part with the decrypted result, computing the second instruction so as to obtain a second computing result of the second instruction, and comparing the second computing result of the second instruction with the first computing result of the second instruction by the card, if they are identical, sending a second success response status code to the card connector and going to Step C10; while if they are not identical, sending a second failure response status code to the card connector;

Step C10, waiting for receiving a third instruction, and determining whether the third instruction is received by the card, if yes, going to Step C11; otherwise, returning to Step C10;

Step C11, reading a first computing result of the third instruction from the third instruction by the card, decrypting the third instruction, replacing the original part with the decrypted result, computing the third instruction so as to obtain a second computing result of the third instruction, and comparing the second computing result of the third instruction with the first computing result of the third instruction by the card, if they are identical, sending a third success response status code to the card connector and going to Step C12; while if they are not identical, sending a third failure response status code to the card connector; and Step C12, waiting for receiving a fourth instruction, and determining whether the fourth instruction is received by the card, if yes, executing the fourth instruction and waiting for receiving the application; otherwise, returning to Step C12.

Preferably, generating a first session key in Step C2 comprises generating a first derivative data with a serial counting value, a first constant and a preset constant, and encrypting the first derivative data with a built-in first key by a specified method so as to obtain the first session key by the card;

generating a second session key by the card comprises generating a second derivative data with the serial counting value, a second constant and the preset constant, and encrypting the second derivative data with a built-in second key by a specified method so as to obtain the second session key;

generating a first data block comprises converging the host inquiring code, the serial counting value, the card inquiring code and the first variable one by one so as to form the first data block;

encrypting the first data block comprises encrypting the first data block with the first session key by a specified method; and the internal initialization response sent to the card connector is an internal initialization response including the first encryption result, the card inquiring code and the serial counting value.

Preferably, generating a fourth data block in Step C4 comprises converging the serial counting value, the card inquiring code, the host inquiring code and the first variable one by one so as to form the fourth data block; and encrypting the fourth data block comprises encrypting the fourth data block with the first session key by specified method.

Preferably, computing the authentication data in Step C5 comprises computing the authentication data with the second session key and a card information value.

Preferably, decrypting in Step C7 or Step C9 or Step C11 comprises decrypting a data field of the instruction with the first session key in a specified method by the card; and computing the instruction comprises computing a specified part of the instruction with the second session key and the card information value.

Advantages of solutions disclosed by embodiments of the invention include: safely downloading an application is realized by applying full-cipher text communication and a controlled times of installing the application through a card activating operation. The invention realizes full cipher text communication between a card and a card connector and controls the card issuing times. With the method, an application is ensured to be independent and secure in case of issuing a card, and the card issuing times is limited, which prevent from an intermediary or a customer from arbitrarily downloading the application and therefore have a high security.

DESCRIPTION OF THE ACCOMPANYING DRAWINGS OF THE INVENTION

FIG. 2 is a flow chart of a method for safely downloading an application provided in the embodiment 2 of the invention; and FIG. 3 is a flow chart of a method for safely downloading an application provided in the embodiment 3 of the invention.

DETAILED EMBODIMENTS OF THE INVENTION

For clarifying the purposes, the technical solutions and the advantages of the invention, a description of the embodiments is explained in detail in conjunction with the drawings.

The card connector referred by the invention is a combination of a host and a principal card.

Embodiment 1

Figure 1:
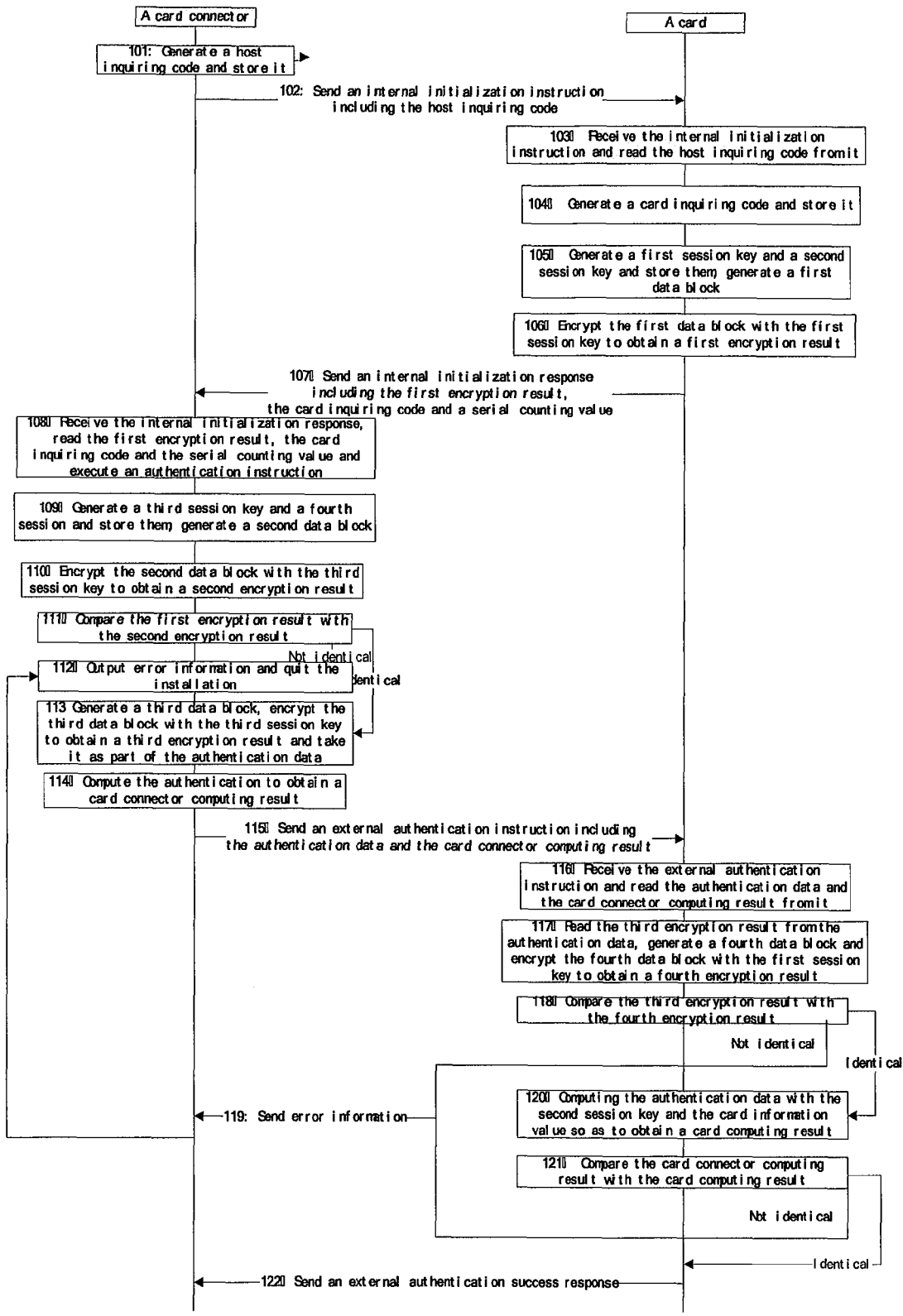
FIGS. 1-1, 1-2 and 1-3 are flow charts of a method for safely downloading an application provided in the embodiment 1 of the invention.

As illustrated in FIG. 1-1, a method for safely downloading an application is provided in the embodiment 1.

Step 101, a card connector generates a host inquiring code and stores the host inquiring code.

In the embodiment 1, the host inquiring code is a random number with 8 bytes. For example, the host inquiring code is 1122334455667788.

Step 102, the card connector sends an internally initializing instruction including the host inquiring code to the card.

In the embodiment 1, the step includes sending an internally initializing instruction with the first two bytes 8050, including the host inquiring code.

For example, the internally initializing instruction is 8050000008.1122334455667788.

Step 103, the card receives the internally initializing instruction and reads the host inquiring code from the internally initializing instruction.

Step 104, the card generates and stores a card inquiring code.

In the embodiment 1, the card inquiring code is a random number with 6 bytes.

For example, the card inquiring code is 010203040506.

Step 105, the card generates a first session key, a second session key, stores the first session key and the second session key, and generates a first data block according to the host inquiring code, a serial counting value and the card inquiring code.

In the embodiment 1, the card generates two session keys with the serial counting value of two bytes, two constants of two bytes agreed with by the card and the host and two internal keys, in which the two internal keys are respectively a first key with 16 bytes and a second key with 16 bytes.

For example, the serial counting value is 0001.

The first constant is 0182.

The second constant is 0101.

The first key is 404142434445464748494a4b4c4d4e4f.

The second key is 404142434445464748494a4b4c4d4e4f.

The step includes that the card generates a first derivative data with the serial counting value of two bytes, the first constant of two bytes agreed with by the host and the card and 12 bytes of 00, encrypts the first derivative data with the first key by 3DES-CBC algorithm or encrypts the first derivative data with the first key by other algorithm so as to generate the first session key.

For example, the first derivative data is 01820001000000000000000000000000.

The first session key is 25C9794A1205FF244F5FA0378D2F8D59.

The card generates a second derivative data with the serial counting value of two bytes, the second constant of two bytes agreed with by the card and the host, and 12 bytes of 00, encrypts the second derivative data with the second key by specified algorithm, for example, 3DES-CBC, so as to generate the second session key.

For example, the second derivative data is 01010001000000000000000000000000.

The second session key is 9BED98891580C3B245FE9EC58BFA8D2A.

In the embodiment 1, the first data block is generated by connecting the host inquiring code, the serial counting value and the card inquiring code 8000000000000000.

For example, the first data block is
1122334455667788000101020304050680000000000000000.

Step 106, the card encrypts the first data block with the first session key so as to obtain a first encryption result.

In the embodiment 1, the encrypting the first data block with the first session key uses specified algorithm such as 3DES-CBC and obtains the first encryption result with 8 bytes.

For example, the first encryption result is 6DF0F3DE2BAE36AA.

Step 107, the card sends an internal initialization response including the first encryption result, the card inquiring code and the serial counting value to the card connector.

For example, the internal initialization response is 000000000000000000FF02000101020304050 66DF0F3DE2BAE36AA9000.

Step 108, the card connector receives the internal initialization response, reads a first encryption result, the card inquiring code and the serial counting value from the internal initialization response and executes an authenticating instruction including the internal initialization response.

In the embodiment 1, the authenticating instruction is an instruction with the first three bytes 808050 constructed by the card connector, including the internal initialization response.

For example, 8080500024E14D46103FFC193A00000000000000000000FF02000101020304050 66DF0F 3DE2BAE36AA9000;

Step 109, the card connector generates a third session key and a fourth session key and stores the third session key and the fourth session key, and generates a second data block in accordance with the host inquiring code, the serial counting value and the card inquiring code.

In the embodiment 1, the card connector generates two session keys with the serial counting value of two bytes, two constants of two bytes agreed with by the card and the host and two internal keys, in which the two internal keys are respectively the first key of with 16 bytes and the second key with 16 bytes.

Specifically, the card connector generates a third derivative data with the serial counting value of two bytes, the first constant of two bytes agreed with by the card and the host and 12 bytes of 00, encrypts the third derivative data with the first key by 3DES-CBC algorithm or encrypts the third derivative data with the first key by other algorithm so as to generate the third session key.

For example, the third derivative data is 01820001000000000000000000000000 and the third session key is 25C9794A1205FF244F5FA0378D2F8D59.

The card connector generates a fourth derivative data with the serial counting value of two bytes, the second constant of two bytes agreed with by the card and the host and 12 bytes of 00, encrypts the fourth derivative data with the second key by specified algorithm, such as 3DES-CBC, so as to generate the fourth session key.

For example, the fourth derivative data is 01010001000000000000000000000000, and the fourth session key is 9BED98891580C3B245FE9EC58BFA8D2A.

In the embodiment 1, the second data block is generated by connecting the host inquiring code, the serial counting value, the card inquiring code and 8000000000000000.

For example, the second data block is 11223344556677880001010203040506 8000000000000000.

Step 110, the card connector encrypts the second data block with the third session key so as to obtain a second encryption result.

In the embodiment 1, the encrypting the second data block with the third session key uses a specified algorithm 3DES-CBC and obtains the second encryption result with 8 bytes.

Step 111, the card connector compares the first encryption result with the second encryption result, if they are identical, Step 113 is executed; while if they are not identical, Step 112 is executed.

Step 112, output error information and quit the installation.

Step 113, the card connector generates a third data block in accordance with the host inquiring code, the serial counting value and the card inquiring code, encrypts the third data block with the third session key so as to obtain a third encryption result and takes the third encryption result as a part of the authentication result.

In the embodiment 1, the third data block is generated by connecting the serial counting value, the card inquiring code, the host inquiring code and 8000000000000000.

For example, the third data block is 00010102030405061122334455667788 80000000000000000;

The encrypting the third data block with the third session key by specified algorithm uses algorithm 3DES-CBC and obtains the third encryption result with 8 bytes such as 8E14AC21FAE976BF.

Step 114, the card connector computes the authentication data with the fourth session key and a card connector information value so as to obtain a computing result of the card connector.

In the embodiment 1, after computing the authentication data with the fourth session key and the card connector information value, the card connector obtains a computing result of the card connector with 8 bytes, for example, 0FF4783B36D6CF61, in which an initial value of the card connector information value is 8 bytes of 00.

Step 115, the card connector sends an external authenticating instruction including the authentication data and the card connector computing result to the card.

For example, the external authentication command is 84820300108E14AC21FAE976BF0FF4783B36D6CF61.

Step 116, the card receives the external authenticating instruction and reads authentication data and the card connector computing result from the external authenticating instruction.

In the embodiment 1, the last 8 bytes of the external authenticating instruction is read as the card connector computing result.

Step 117, the card reads a third encryption result from the authentication data, generates a fourth data block in accordance with the host inquiring code, the serial counting value and the card inquiring code and encrypts the fourth data block with the first session key so as to obtain a fourth encryption result.

In the embodiment 1, the fourth data block is generated by connecting the serial counting value, the card inquiring code, the host inquiring code and 8000000000000000.

For example, the fourth data block is 00010102030405061122334455667788 8000000000000000.

The encrypting the fourth data block with the first session key uses a specified algorithm 3DES-CBC and obtains the fourth encryption result with 8 bytes.

Step 118, the card compares the third encryption result with the fourth encryption result.

If they are identical, Step 120 is executed; while if they are not identical, Step 119 is executed.

Step 119, the card sends error information to the card connector and returns to Step 112.

Step 120, the card computes the authentication data with the second session key and the card information value so as to obtain a card computing result.

In the embodiment 1, after computing the authentication data with the second session key, a card computing result with 8 bytes is obtained.

Step 121, the card compares the card connector computing result with the card computing result;

If they are identical, Step 122 is executed; while if they are not identical, Step 119 is executed.

Figures 1, 2:
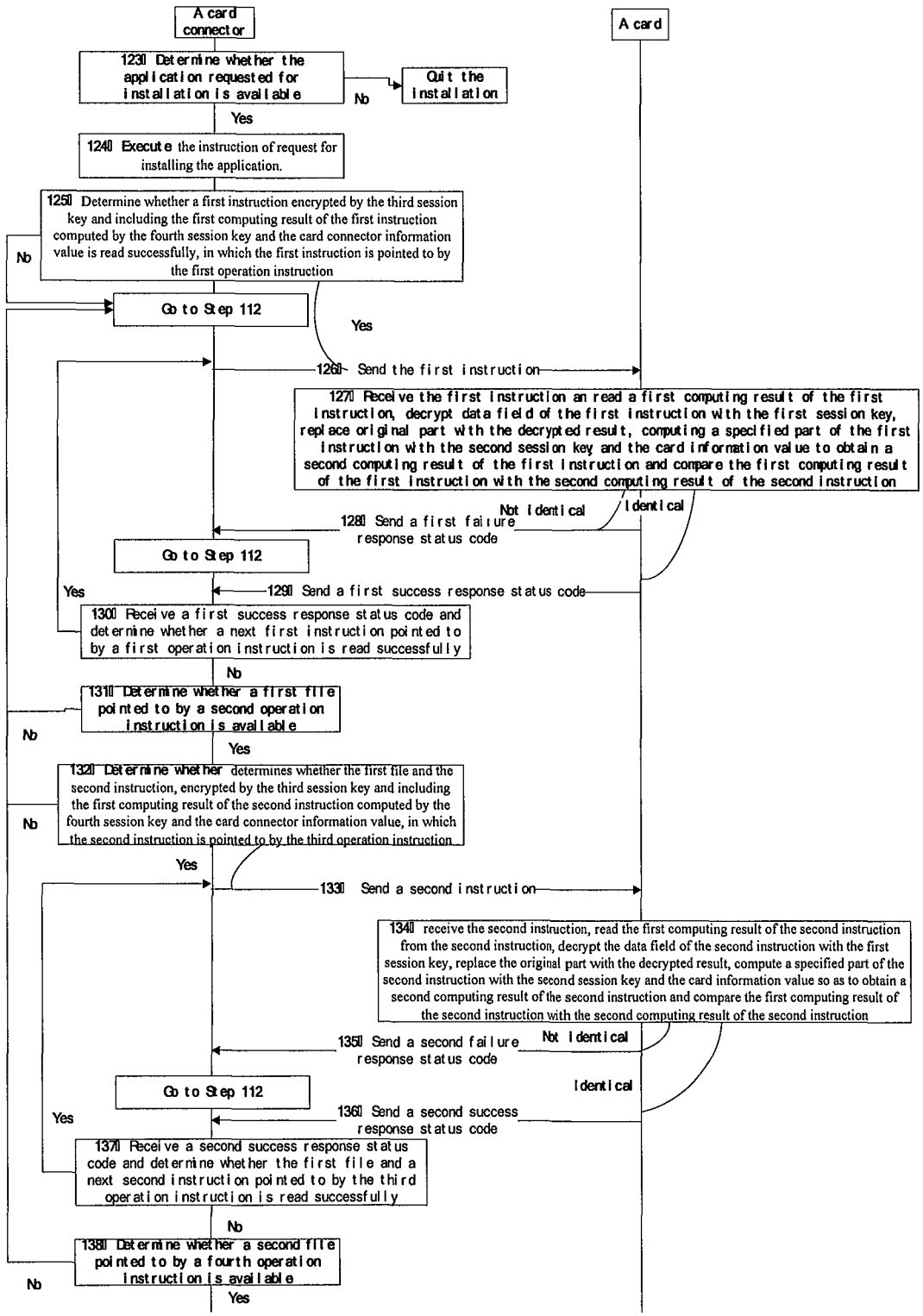

Step 122, the card sends an external authentication success response to the card connector and Step 123 is executed as illustrated in FIG. 1-2.

Step 123, the card connector determines whether the application requested for installation is available, if yes, Step 124 is executed; if no, the installation is quitted.

In the embodiment 1, whether the application requested for installing is available is determined according to the eighth character of the instruction of requesting for installing an application. For example, the instruction of requesting for installing an application is 808000BX, if the Xth value is within a preset range, the application requested for installing is available, and the initial value of X is 1.

Step 124, the card connector executes the instruction of requesting for installing an application.

In the embodiment 1, the step 124 includes setting data which should be set and clearing data which should be cleared.

Step 125, the card connector determines whether a first instruction is read successfully, in which the first instruction is pointed to by the first operation instruction, the first instruction id encrypted by the third session key, and the first instruction is formed with the first computing result of the first instruction computed by the fourth session key and the card connector information value;

if yes, Step 126 is executed; while if no, Step 112 is executed.

In the embodiment 1, the first operation instruction is 808010XX and therefore the card connector reads the XXth instruction of the 01 type of file. XX is within the preset range, for example 1-3, and initial value of XX is 1. The reading the first instruction includes:

Firstly, computing the first instruction with the fourth session key and the card connector information value so as to obtain a first computing result of the first instruction, in which the computation procedure is omitted;

Secondly, adding the computing result of the first instruction to right side of the first instruction, encrypting a data field of the first instruction with the third session key by specified algorithm, such as 3DES-CBC algorithm; replacing the original part with the encrypted result so as to obtain a final first instruction, for example,

84E4000018B72E016B0F470C92D411F4A2D480FA 43BC372CF359FF2C3D, in which the first computing result of the first instruction is BC372CF359FF2C3D.

Step 126, the card connector sends the first instruction to the card.

Step 127, the card receives the first instruction, reads the first computing result of the first instruction from it, decrypts a data field of the first instruction with the first session key and replaces the original part with the decrypted result, computes a specified part of the first instruction with the second session key and a card information value so as to obtain a second computing result of the first instruction and compares the first computing result of the first instruction with the second computing result of the first instruction.

If they are identical, Step 129 is executed; while if they are not identical, Step 128 is executed.

In the embodiment 1, the last 8 bytes of the first instruction refer to the first computing result of the first instruction. In the step of decrypting the data field of the first instruction with the first session key by specified algorithm, the specified algorithm is 3DES-CBC. The specified part of the first instruction is the remainder other than the last 8 bytes.

Step 128, the card sends a first failure response status code to the card connector and Step 112 is executed.

Step 129, the card sends a first success response status code to the card connector.

Step 130, the card connector receives the first success response status code and determines whether a next first instruction pointed to by the first operation instruction is read successfully.

If yes, Step 126 is executed; while if no, Step 131 is executed.

In the embodiment 1, the determining step is the same with that described in Step 125.

Step 131, the card connector determines whether a first file pointed to by a second operation instruction is available.

If yes, Step 132 is executed; while if no, Step 112 is executed.

In the embodiment 1, whether the first file is available is determined by the eighth byte of the second operation instruction. For example the second operation instruction is 8080002Y. If Y is within a preset range, the first file is available; and if Y is not within the preset range, the first file is not available. A preferred range of Y is 1-2 and the initial value of Y is 1.

Step 132, the card connector determines whether the first file and the second instruction, encrypted by the third session key and including the first computing result of the second instruction computed by the fourth session key and the card connector information value, in which the second instruction is pointed to by the third operation instruction.

If yes, Step 133 is executed; while if no, Step 112 is executed.

In the embodiment 1, the third operation instruction is 808020YY. YY is within the preset range, for example 1-2. Initial value of YY is 1. Reading the second instruction includes:

Firstly, computing the second instruction with the fourth session key and the card connector information value so as to obtain the first computing result of the second instruction (details of it are eliminated herein);

Secondly, adding the first computing result of the second instruction to the right side of the second instruction, encrypting the data field of the second instruction with the third session key by specified algorithm, for example, 3DES-CBC algorithm, replacing the original part with the encrypted result so as to obtain the final second instruction, for example 80E60200207FE8E33C89B00BF36C4A9918434F782 844E780899AC6C94000B8F28A960597C1. The first computing result of the second instruction is 00B8F28A960597C1.

Step 133, the card connector sends the second instruction to the card.

Step 134, the card receives the second instruction, reads the first computing result of the second instruction from the second instruction, decrypts a data field of the second instruction with the first session key, replaces the original part with the decrypted result, computing a specified part of the second instruction with the second session key and the card information value so as to obtain a second computing result of the second instruction and compares the first computing result of the second instruction with the second computing result of the second instruction.

If they are identical, Step 136 is executed; while if they are not identical, Step 135 is executed.

In the embodiment 1, the last 8 bytes of the second instruction refer to the first computing result of the second instruction. Decrypting the data field of the second instruction with the first session key uses specified algorithm, such as 3DES-CBC algorithm. The specified part of the second instruction is remainder other than the last 8 bytes.

Step 135, the card sends a second failure response status code to the card connector and Step 112 is executed.

Step 136, the card sends a second success response status code to the card connector.

Step 137, the card connector receives the second success response status code and determines whether a first file and a next second instruction pointed to by the third operation instruction are read successfully.

If yes, Step 133 is executed; while if no, Step 138 is executed.

Step 138, the card connector determines whether a second file pointed to by a fourth operation instruction is available.

Figures 1, 2, 3:
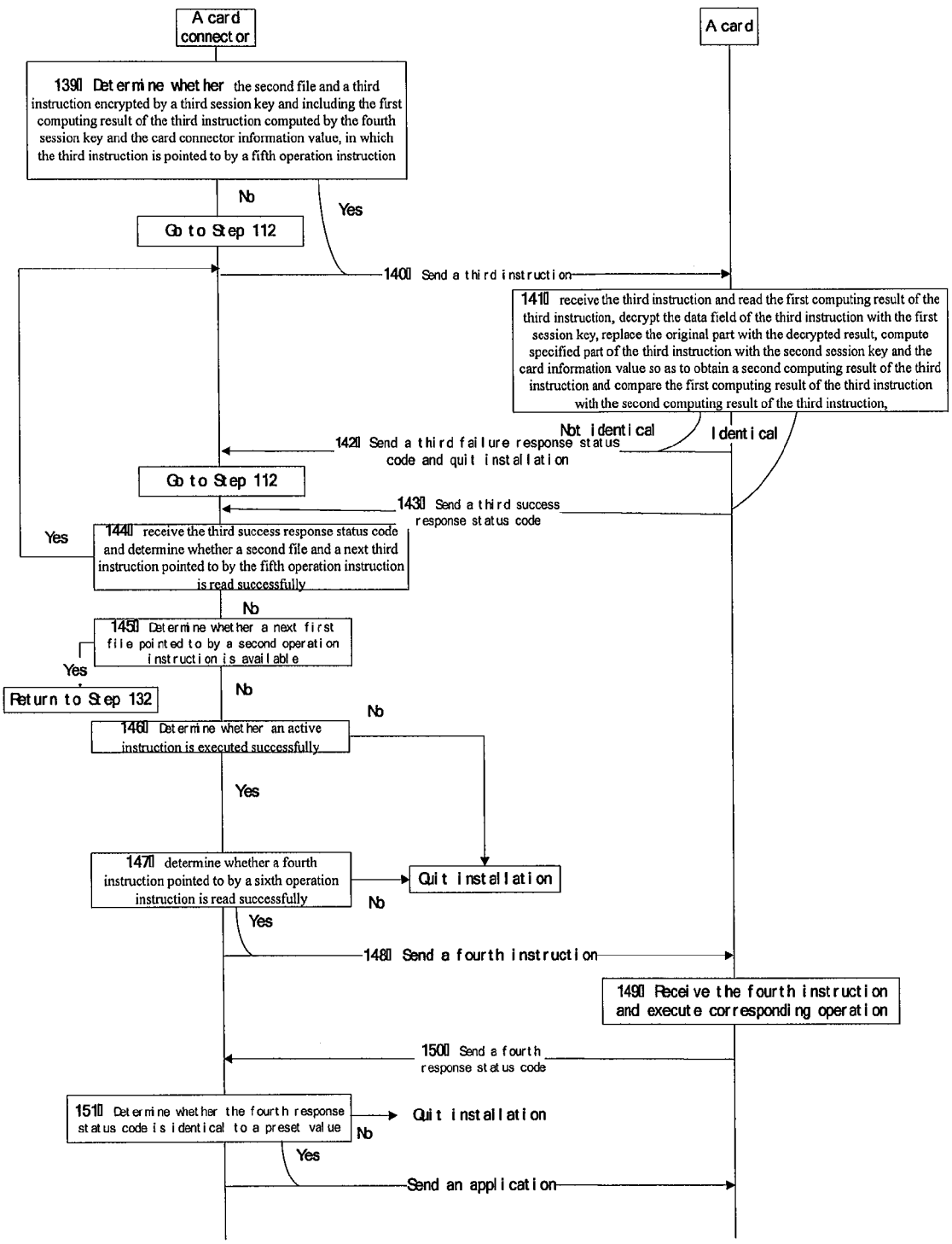
Figure 2:
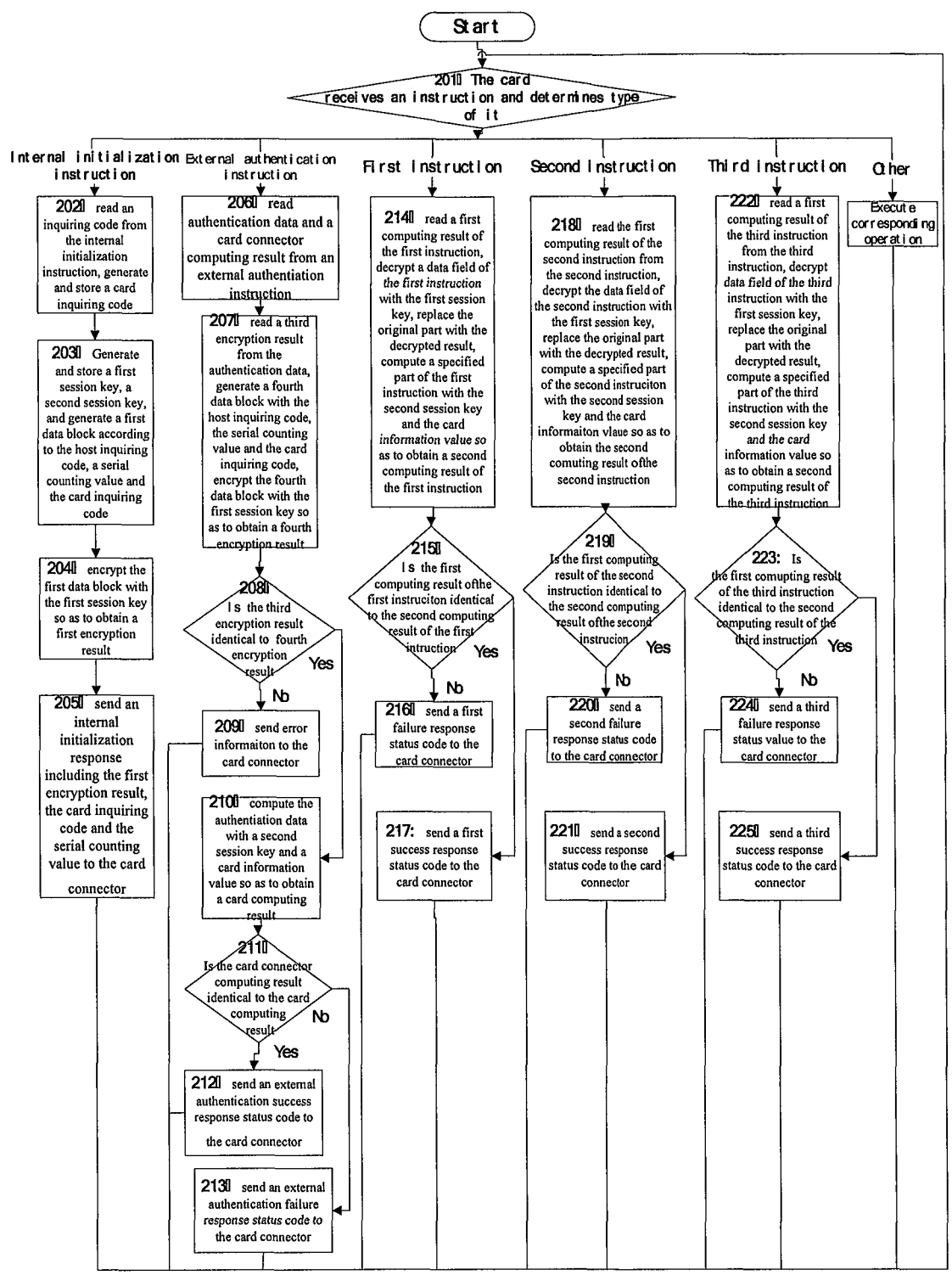
Figure 3:
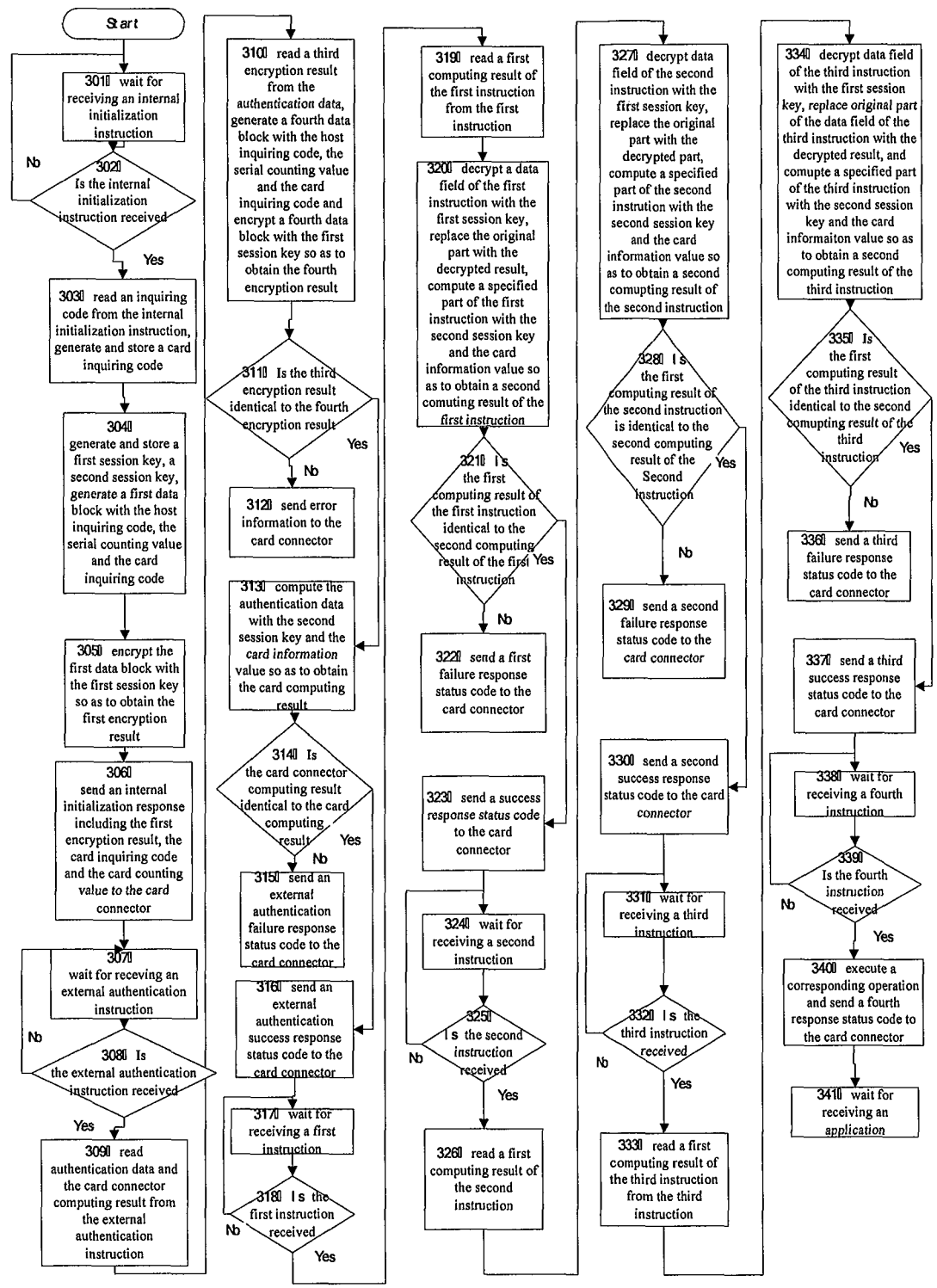

If yes, Step 139 is executed as illustrated in FIGS. 1-3; while if no, Step 112 is returned.

In the embodiment 1, the card connector executes 8080003Z, in which Z is within a preset range, for example 1-2. Initial value of Z is 1.

Step 139, the card connector determines whether the second file and a third instruction encrypted by a third session key and including the first computing result of the third instruction computed by the fourth session key and the card connector information value, in which the third instruction is pointed to by a fifth operation instruction.

If yes, Step 140 is executed; while if no, Step 112 is executed.

In the embodiment 1, the fifth operation instruction is 808030ZZ, in which ZZ is within a preset range, for example 1-200. Initial value of the ZZ is 1.

Firstly, computing the third instruction with the fourth session key and a card connector information value so as to obtain a first computing result of the third instruction and details of the computing are eliminated herein.

Secondly, adding the computing result of the third instruction to right side of the third instruction, encrypting a data field of the third instruction with the third session key by specified algorithm, such as 3DES-CBC algorithm, replacing the original part with the encrypted result so as to obtain a final third instruction, for example, 80E80000C8C4820FAF010022DECAFFED02020200 010AD15600013203010302010D6A 6176616361726 42F46696C65020021002200210000015011A00C00B7 1000A01BA002D04D11F420000000000000200000400 1502000107A00000006200010201 07A00000006201010 600C00000008000010001010000010019008000040003 0107000000260 02B00300035003C0043004800000E00F F000801000000880 00026010001 0905000000A300AA0 0B200D500F800003201FF000B02000001 21013500800 001D81A3A70053F941A, in which the first computing result of the third instruction is D81A3A70053F941A.

Step 140, the card connector sends the third instruction to the card.

Step 141, the card receives the third instruction and reads the first computing result of the third instruction, decrypts the data field of the third instruction with the first session key, replaces the original part with the decrypted result, computes specified part of the third instruction with the second session key and the card information value so as to obtain a second computing result of the third instruction and compares the first computing result of the third instruction with the second computing result of the third instruction.

If they are identical, Step 143 is executed; while if no, Step 142 is executed.

In the embodiment 1, the last 8 bytes of the third instruction refer to the first computing result of the third instruction; the first session key is used to compute the data field of the third instruction with specified algorithm, for example, 3DES-CBC algorithm; the specified part of the third instruction is remainder other than the last 8 bytes.

Step 142, the card sends a third failure response status code to the card connector and Step 112 is returned.

Step 143, the card sends a third success response status code to the card connector.

Step 144, the card connector receives the third success response status code and determines whether a second file and a next third instruction pointed to by the fifth operation instruction are read successfully.

If yes, Step 140 is executed; while if no, Step 145 is executed.

Step 145, the card connector determines whether a next first file pointed to by the second operation instruction is available.

If yes, Step 132 is executed; while if no, Step 146 is executed.

Step 146, the card connector determines whether an activating instruction is executed successfully.

If yes, Step 147 is executed; while if no, the installation is quitted.

In the embodiment 1, the activating instruction is 0088. If times of activation is larger than 0; the activation operation is executed and times of the available activation operation of the card connector is deducted by 1.

Step 147, the card connector determines whether a fourth instruction pointed to by a sixth operation instruction is read successfully, if yes, Step 148 is executed; if no, the installation is quitted. For example, the sixth instruction is 808040MM. Step 148, the card connector sends the fourth instruction to the card.

In the embodiment 1, the fourth instruction is the instruction with the first 3 bytes 0X84E60C, for example,
84E60C003807D2C6A5A82486A810A958901D59B2 0914BFAD0C5C729292927E0F3D207874AD67412DBF F2ECDC7A1F628516F9D6C54CB32AB42CE60364EE.

Step 149, the card receives the fourth instruction and executes a corresponding operation.

In the embodiment 1, details of the step are eliminated herein.

Step 150, the card sends a fourth response status code to the card connector.

In the embodiment 1, if the card executes the fourth instruction successfully, the fourth response status code 9000 is sent to the card connector.

Step 151, determine whether the fourth response status code is identical to a preset value.

If yes, send the application to the card; while if no, quit the installation.

In the embodiment 1, if the fourth response status code received by the card connector is identical to 9000, the fourth response status code is identical to the preset value.

Embodiment 2

As illustrated in FIG. 2, a method for safely downloading an application is provided in the Embodiment 2.

Step 201, the card receives an instruction and determines type of the instruction.

In the embodiment 2, if the first two bytes of the instruction are 0X8050, the instruction is an internally initializing instruction and Step 202 is executed;

if the former two bytes of the instruction are 0X8482, the instruction is an external initialization instruction and Step 206 is executed;

if the former two bytes of the instruction are 0X84E4, the instruction is a first instruction and Step 214 is executed;

if the former two bytes of the instruction are 0X80E6, the instruction is a second instruction and Step 218 is executed;

if the former two bytes of the instruction are 0X80E8, the instruction is a third instruction and Step 222 is executed; and if the instruction is other instruction, a corresponding operation is executed and Step 201 is executed.

Specifically, the other instruction includes the fourth instruction with the first 3 bytes 0X84E60C.

Step 202, read a host inquiring code from the internally initializing instruction, generate a card inquiring code and store the card inquiring code.

In the embodiment 2, in the step of reading a host inquiring code from the internally initializing instruction, the internally initializing instruction is 80500000081122334455667788 and the host inquiring code is 1122334455667788.

The card generates the card inquiring code of six bytes, for example 010203040506.

Step 203, generate a first session key, a second session key, store the first session key and the second session key and generate a first data block according to the host inquiring code, a serial counting value and the card inquiring code.

Specifically, generate first derivative data by connecting a first constant of two bytes, a serial counting value of two bytes and 12 bytes of 00; and compute the first derivative data with the first key by 3DES-CBC algorithm so as to obtain the first session key.

For example, the first key is 0182000100000000000000000000000; and the first session key is 25C9794A1205FF244F5FA0378D2F8D59.

Generate second derivative data by connecting a second constant of two bytes, the serial counting value of two bytes and 12 bytes of 00; and compute the second derivative data with a second internal key by 3DES-CBC algorithm so as to obtain a second session key.

For example, the second internal key is 0101000100000000000000000000000; and the second session key is 9BED98891580C3B245FE9EC58BFA8D2A.

The card generates the first data block by connecting the serial counting value of two bytes, the card inquiring code of six bytes, the host inquiring code of 8 bytes and 8000000000000000.

For example, the first data block is 000101020304050611223344556677888000000000000000.

Step 204, encrypt the first data block with the first session key so as to obtain a first encryption result.

In the embodiment 2, encrypt the first data block with the first session key by 3DES-CBC algorithm so as to obtain a first encryption result with 8 bytes, for example, 6DF0F3DE2BAE36AA.

Step 205, send an internal initialization response including the first encryption result, the card inquiring code and the serial counting value to the card connector and go to Step 201.

In the embodiment 2, the internal initialization response is 000000000000000000000FF0200010102030405066DF0F3DE2BAE36AA9000.

Step 206, read authentication data and a card connector computing result from an external authentication instruction.

In the embodiment 2, the last 8 bytes of the external authenticating instruction refer to the card connector computing result, for example, 0FF4783B36D6CF61. Specifically, the external authenticating instruction is 84820300108E14AC21FAE976BF0FF4783B36D6CF61; and the card connector computing result is 0FF4783B36D6CF61.

Step 207, read a third encryption result from the authentication data, generate a fourth data block with the host inquiring code, the serial counting value and the card inquiring code, encrypt the fourth data block with the first session key so as to obtain a fourth encryption result.

In the embodiment 2, the fourth data block is generated by connecting the serial counting value, the card inquiring code, the host inquiring code and 8000000000000000.

For example, the fourth data block is 000101020304050611223344556677888000000000000000.

Encrypt the fourth data block with the first session key by a specified method, for example, 3DES-CBC algorithm, so as to obtain a fourth encryption result with 8 bytes, for example, 8E14AC21FAE976BF.

Step 208, determine whether the third encryption result is identical to the fourth encryption result.

If yes, go to Step 210; while if no, go to Step 209.

Step 209, send error information to the card connector and go to Step 201.

Step 210, compute the authentication data with a second session key and a card information value so as to obtain a card computing result.

In the embodiment 2, the card computes the authentication data with the second session key and the card information value so as to obtain 8 bytes of the card computing result, for example, 0FF4783B36D6CF61. Initial value of the card information value is 8 bytes of 00.

Step 211, determine whether the card connector computing result is identical to the card computing result.

If yes, go to Step 212; while if no, go to Step 213.

Step 212, send an external authentication success response status code to the card connector and go to Step 201.

Step 213, send an external authentication failure response status code to the card connector and go to Step 201.

Step 214, read a first computing result of the first instruction from the first instruction, decrypt a data field of the first instruction with the first session key, replace the original part with the decrypted result, compute a specified part of the first instruction with the second session key and the card information value so as to obtain a second computing result of the first instruction.

In the embodiment 2, the last 8 bytes of the first instruction are the first computing result of the first instruction, decrypt the data field of the first instruction with the first session key by specified algorithm, for example, 3DES-CBC algorithm, the specified part of the first instruction is the remainder other than the last 8 bytes. The card computes the specified part of the first instruction with the second session key and the card information value so as to obtain a 8-byte second computing result of the first instruction. For example, the first instruction is 84E4000018B72E016B0F470C92D411F4A2D480F A43BC372CF359FF2C3D, in which the first computing result of the first instruction is BC372CF359FF2C3D.

Step 215, determine whether the first computing result of the first instruction is identical to the second computing result of the first instruction.

If yes, go to Step 217; while if no, go to Step 216.

Step 216, send a first failure response status code to the card connector and go to Step 201.

Step 217, send a first success response status code to the card connector and go to Step 201.

Step 218, read the first computing result of the second instruction from the second instruction, decrypt a data field of the second instruction with the first session key, replace the original part with the decrypted result, compute a specified part of the second instruction with the second session key and the card information value so as to obtain a second computing result of the second instruction.

In the embodiment 2, the last 8 bytes of the second instruction refer to the first computing result of the second instruction, decrypt the data field of the second instruction with the first session key by specified algorithm, for example, 3DES-CBC algorithm, the specified part of the second instruction is a remainder other than the last 8 bytes. The card computes the specified part of the second instruction with the second session key and the card information value so as to obtain 8-byte second computing result of the second instruction. For example, the second instruction is 80E60200207FE8E33C89B00BF36C4A9918434F782 844E780899AC6C94000B8F28A960597C1 and the first computing result of the second instruction is 00B8F28A960597C1.

Step 219, determine whether the first computing result of the second instruction is identical to the second computing result of the second instruction.

If yes, go to Step 221; while if no, go to Step 220.

Step 220, send a second failure response status code to the card connector and go to Step 201.

Step 221, send a second success response status code to the card connector and go to Step 201.

Step 222, read a first computing result of the third instruction from the third instruction, decrypt a data field of the third instruction with the first session key, replace the original part with the decrypted result, compute a specified part of the third instruction with the second session key and the card information value so as to obtain a second computing result of the third instruction.

In the embodiment 2, the last 8 bytes of the third instruction refer to a first computing result of the third instruction. Decrypt the data field of the third instruction with the first session key by specified algorithm, for example, 3DES-CBC algorithm. The specified part of the third instruction is remainder other than the last 8 bytes. The card computes the specified part of the third instruction with the second session key and the card information value so as to obtain a second computing result of the third instruction. For example, the third instruction is 80E80000C8C4820FAF010022DECAFFED020202 00010AD15600013203010302010D6A 617661636172642F46696C6502002100220021000000 15011A00C00B71000A01BA002D04D11F4200000000 0000020000040015020001017A00000006200010020107 A00000006201010600C0000000800001000101000001 00190080000400030107000000026002B00300035003C0 043004800000E00FF000801000000880000260100010 05000000A300AA00B200D500F800003201FF000B0 200000121013500800001D81A3A70053F941A, in which the first computing result of the third instruction is D81A3A70053F941A.

Step 223, determine whether the first computing result of the third instruction is identical to the second computing result of the third instruction.

If yes, go to Step 225; while if no, go to Step 224.

Step 224, send a third failure response status value to the card connector and go to Step 201.

Step 225, send a third success response status code to the card connector and go to Step 201.

Embodiment 3

As illustrated in FIG. 3, a method for safely downloading an application is provided in the Embodiment 3.

Step 301, wait for receiving an internally initializing instruction.

Step 302, determine whether the internally initializing instruction is received.

If yes, Step 303 is executed; while if no, Step 301 is executed.

In the embodiment 3, determine whether the received is the internally initializing instruction according to former two bytes of the instruction, if the first two bytes are 0X8050, the received is the internally initializing instruction; if the first two bytes are not 0X8050, the received is not the internally initializing instruction. For example, 80500000081122334455667788.

Step 303, read a host inquiring code from the internally initializing instruction, generate a card inquiring code and store the card inquiring code.

In the embodiment 3, the last 8 bytes of the internally initializing instruction refer to the host inquiring code, for example, 1122334455667788. The card generates a random number with 6 bytes as the card inquiring code, for example, 010203040506.

Step 304, generate a first session key, a second session key and store the first session key and the second session key, generate a first data block with the host inquiring code, a serial counting value and the card inquiring code.

Generate first derivative data by converging a first constant of two bytes, the serial counting value of two bytes and 12 bytes of 00, compute the first derivative data with the first key by 3DES-CBC algorithm so as to obtain the first session key, for example,

0182000100000000000000000000000000.

The first session key is 25C9794A1205FF244F5FA0378D2F8D59.

Generate second derivative data with a method of converging a second constant of two bytes, the serial counting number of two bytes and 12 bytes of 00, compute the second derivative data with a second internal key by 3DES-CBC algorithm so as to obtain the second session key. For example, the second internal key is 01010001000000000000000000000000.

The second session key is 9BED98891580C3B245FE9EC58BFA8D2A.

The card generates the first data block by converging the serial counting value of two bytes, the card inquiring code of six bytes, the host inquiring code of 8 bytes and 8000000000000000. For example, the first data block is 00010102030405061122334455667788800000000000 00000.

Step 305, encrypt the first data block with the first session key so as to obtain the first encryption result.

In the embodiment 3, encrypt the first data block with the first session key by 3DES-CBC algorithm so as to obtain the first encryption result with 8 bytes, for example 6DF0F3DE2BAE36AA.

Step 306, send an internal initialization response including a first encryption result, the card inquiring code and the serial counting value to the card connector.

For example, the internal initialization response is 00000000000000000000FF02000101020304050 66DF0F3DE2BAE36AA9000.

Step 307, wait for receiving an external authenticating instruction.

Step 308, determine whether the external authenticating instruction is received.

If yes, Step 309 is executed; while if no, Step 307 is executed.

In the embodiment 3, determine whether the external authenticating instruction is received according to the former two bytes of the instruction, if the first two bytes are 0X8482, the external authenticating instruction is received; if the first two bytes are not 0X8482, the external authenticating instruction is not received. For example, 84820300108E14AC21FAE976BF0FF4783B36D6CF61.

Step 309, read authentication data and a card connector computing result from the external authenticating instruction.

In the embodiment 3, the last 8 bytes of the external authentication instruction refer to the card connector computing result, for example, 0FF4783B36D6CF61.

Step 310, read a third encryption result from the authentication data, generate a fourth data block with the host inquiring code, the serial counting value and the card inquiring code and encrypt the fourth data block with the first session key so as to obtain a fourth encryption result.

In the embodiment 3, the fourth data block is generated by converging the serial counting value, the card inquiring code, the host inquiring code and 8000000000000000.

For example, the fourth data block is 000101020304050611223344556677888000000000 000000.

Encrypt the fourth data block with the first session key by specified algorithm so as to obtain the fourth encryption result with 8 bytes, for example, 8E14AC21FAE976BF.

Step 311, determine whether the third encryption result is identical to the fourth encryption result.

If they are identical, Step 313 is executed; while if they are not identical, Step 312 is executed.

Step 312, send error information to the card connector.

Step 313, compute the authentication data with the second session key and a card information value so as to obtain a card computing result.

In the embodiment 3, compute the authentication data with the second session key and the card information value so as to obtain the card computing result with 8 bytes, for example, 0FF4783B36D6CF61, in which an initial value of the card information value refers to 8 bytes of 00.

Step 314, determine whether the card connector computing result is identical to the card computing result.

If they are identical, Step 316 is executed; if they are not identical, Step 315 is executed.

Step 315, send an external authentication failure response status code to the card connector.

Step 316, send an external authentication success response status code to the card connector.

Step 317, wait for receive a first instruction.

Step 318, determine whether the first instruction is received.

If the first instruction is received, Step 319 is executed; while if the first instruction is not received, Step 317 is executed.

In the embodiment 3, determine whether the first instruction is received according to the first two bytes of the instruction, if the first two bytes are 0X84E4, the first instruction is received; if the first two bytes are not 0X84E4, the first instruction is not received.

For example, 84E4000018B72E016B0F470C92D411F4A2D480 FA43BC372CF359FF2C3D.

Step 319, read a first computing result of the first instruction from the first instruction.

In the embodiment 3, read the last 8 bytes of the first instruction as the first computing result of the first instruction, for example, BC372CF359FF2C3D.

Step 320, decrypt a data field of the first instruction with the first session key, replace the original part with the decrypted result, compute a specified part of the first instruction with the second session key and the card information value so as to obtain a second computing result of the first instruction.

In the embodiment 3, decrypt the data field of the first instruction with the first session key by specified algorithm, for example, 3DES-CBC algorithm. The specified part of the first instruction is a remainder other than the last 8 bytes. The card computes the specified part of the first instruction with the second session key and the card information value so as to obtain the 8-byte second computing result of the first instruction.

Step 321, determine whether the first computing result of the first instruction is identical to the second computing result of the first instruction.

If they are identical, Step 323 is executed; while if they are not identical, Step 322 is executed.

Step 322, send a first failure response status code to the card connector.

Step 323, send a success response status code to the card connector.

Step 324, wait for receiving a second instruction.

Step 325, determine whether the second instruction is received.

If the second instruction is received, Step 326 is executed; while if the second instruction is not received, Step 324 is executed.

In the embodiment 3, determine whether the second instruction is received according to former two bytes of the instruction, if the former two bytes are 0X80E6, the second instruction is received; if the former two bytes are not 0X80E6, the second instruction is not received. For example, 80E60200207FE8E33C89B00BF36C4A9918434F78 2844E780899AC6C94000B8F28A960597C1.

Step 326, read a first computing result of the second instruction from the second instruction.

In the embodiment 3, the last 8 bytes of the second instruction is the first computing result of the second instruction, for example, 00B8F28A960597C1.

Step 327, decrypt a data field of the second instruction with the first session key, replace the original part with the decrypted part, compute a specified part of the second instruction with the second session key and the card information value so as to obtain a second computing result of the second instruction.

In the embodiment 3, decrypt the data field of the second instruction with the first session key by specified algorithm, for example, 3DES-CBC algorithm. The specified part of the second instruction is remainder other than the last 8 bytes of the second instruction. The card computes the specified part of the second instruction with the second session key and the card information value so as to obtain an 8-byte second computing result of the second instruction.

Step 328, determine whether the first computing result of the second instruction is identical to the second computing result of the second instruction.

If they are identical, Step 330 is executed; while if they are not identical, Step 329 is executed.

Step 329, send a second failure response status code to the card connector.

Step 330, send a second success response status code to the card connector.

Step 331, wait for receiving a third instruction.

Step 332, determine whether the third instruction is received.

If the third instruction is received, go to Step 333; while if the third instruction is not received, go to Step 331.

In the embodiment 3, determine whether the third instruction is received according to the former two bytes, if the former two bytes are 0X80E8, the third instruction is received; if the former two bytes are not 0X80E8, the third instruction is not received. For example, 80E80000C8C4820FAF010022DECAFFED020202
00010AD15600013203010302010D6A6176616361726
42F46696C650200210022002100000015011A00C00B
71000A01BA002D04D11F4200000000000002000004
001502000107A0000000620001020107A00000006201
010600C000000080000100010100000010019008000040
003010700000026002B00300035003C0043004800000E
00FF00080100000088000026010001090500000A30
0AA00B200D500F800003201FF000B02000001210135
00800001D81A3A70053F941A.

Step 333, read a first computing result of the third instruction from the third instruction.

In the embodiment 3, the last 8 bytes of the third instruction are the first computing result of the third instruction, for example D81A3A70053F941A.

Step 334, decrypt a data field of the third instruction with the first session key, replace original part of the data field of the third instruction with the decrypted result, and compute a specified part of the third instruction with the second session key and the card information value so as to obtain a second computing result of the third instruction.

In the embodiment 3, decrypt the data field of the third instruction with the first session key by specified algorithm, for example 3DES-CBC algorithm. The specified part of the third instruction is remainder other than the last 8 bytes of the third instruction. The card computes the specified part of the third instruction with the second session key and the card information value so as to obtain the 8-byte second computing result of the third instruction.

Step 335, determine whether the first computing result of the third instruction is identical to the second computing result of the third instruction.

If they are identical, go to Step 337; while if they are not identical, go to Step 336.

Step 336, send a third failure response status code to the card connector.

Step 337, send a third success response status code to the card connector.

Step 338, wait for receiving a fourth instruction.

Step 339, determine whether the fourth instruction is received.

If the fourth instruction is received, go to Step 340; while if the fourth instruction is not received, go to Step 338.

In the embodiment 3, whether the fourth instruction is received is determined by the former 3 bytes of the instruction, if the first 3 bytes of the instruction is 0X84E60C, the fourth instruction is received; if the first 3 bytes of the instruction is not 0X84E60C, the fourth instruction is not received. For example, 84E60C003807D2C6A5A82486A810A958901D59
B20914BFAD0C5C729292927E0F3D207874AD674
12DBFF2ECDC7A1F628516F9D6C54CB32AB42
CE60364EE Step 340, execute a corresponding operation and send a fourth response status code to the card connector.

In the embodiment 3, if the card executes the fourth instruction successfully, the fourth response status code 9000 is sent to the card connector.

Step 341, wait for receiving the application.

The above mentioned are just embodiments of the invention, but not a limit to the scope of protection of the invention, and amendment or substitution made by those skilled in the art should fall within the scope of protection of the invention. Therefore, the scope of protection of the invention should be based on the appended claims.

The invention claimed is:

1. A method for safely downloading an application, characterized in that said method comprises:

Step A1, generating a host inquiring code and storing the host inquiring code by a card connector, sending an internally initializing instruction including the host inquiring code to a card by the card connector;

Step A2, receiving the internally initializing instruction and reading the host inquiring code from the internally initializing instruction by the card, generating and storing a card inquiring code, a first session key and a second session key by the card, generating a first data block with the host inquiring code, a serial counting value and the card inquiring code, and encrypting the first data block with the first session key, so as to obtain a first encryption result by the card; sending an internal initialization response including the first encryption result, the card inquiring code and the serial counting value to the card connector by the card;

Step A3, receiving the internal initialization response and reading the first encryption result, the card inquiring code, and the serial counting value from the internally initializing instruction by the card connector, executing an authenticating instruction including the internal initialization response by the card connector, generating a third session key and a fourth session key and storing the third session key and the fourth session key by the card connector, generating a second data block with the host inquiring code, the serial counting value and the card inquiring code by the card connector; encrypting the second data block with the third session key so as to obtain a second encryption result, and comparing the second encryption result with the first encryption result by the card connector, if they are identical, going to Step A4; while if they are not identical, outputting error information, and quitting the installation;

Step A4, generating a third data block with the host inquiring code, the serial counting value and the card inquiring code by the card connector; encrypting the third data block with the third session key so as to obtain a third encryption result by the card connector; taking the third encryption result as a part of the authentication data, and computing the authentication data with the fourth session key and a card connector information value so as to obtain a card connector computing result by the card connector; sending an external authenticating instruction including the authentication data and the card connector computing result to the card by the card connector;

Step A5, receiving the external authenticating instruction and reading the authentication data and the card connector computing result from the external authenticating instruction by the card; reading a third encryption result from the authentication data, generating a fourth data block with the host inquiring code, the serial counting value and the card inquiring code by the card connector, encrypting the fourth data block with the first session key so as to obtain a fourth encryption result, and comparing the fourth encryption result with the third encryption result by the card; if they are identical, going to Step A6; while if they are not identical, sending error information and quitting the installation;

Step A6, computing the authentication data with the second session key and a card information value and comparing the obtained card computing result with the card connector computing result by the card, if they are identical, sending an external authentication success response to the card connector by the card and going to Step A7; while if they are not identical, sending error information and quitting the installation; and Step A7, determining whether the application requested for installation is available, if yes, going to Step S1; otherwise, quitting the installation; and Step S1, executing an instruction of request for installing an application, and determining whether a first instruction is received successfully by a card connector, if yes, going to Step S2; otherwise, outputting error information and quitting the installation;

Step S2, sending the first instruction to a card by the card connector;

Step S3, receiving the first instruction and reading a first computing result of the first instruction from the first instruction by the card, comparing the first computing result of the first instruction with a second computing result of the first instruction computed by the first instruction, if they are identical, sending a first success response status code to the card connector and going to Step S4 by the card; if they are not identical, sending a first failure response status code to the card connector, and then quitting the installation by the card;

Step S4, determining whether a next first instruction is read successfully by the card connector, if yes, going back to Step S2; otherwise, going to Step S5;

Step S5, determining whether a second instruction is read successfully by the card connector, if yes, going to Step S6; otherwise, outputting error information and quitting the installation;

Step S6, sending the second instruction to the card by the card connector;

Step S7, receiving the second instruction and reading a first computing result of the second instruction from the second instruction, and comparing the first computing result of the second instruction with a second computing result of the second instruction computed by the second instruction, by the card, if they are identical, sending a second success response status code to the card connector, and going to Step S8; while if they are not identical, sending a second failure response status code to the card connector and quitting the installation;

Step S8, determining whether a next second instruction is read successfully by the card connector, if yes, returning to Step S6; otherwise, going to Step S9;

Step S9, determining whether a third instruction is read successfully by the card connector, if yes, going to Step S10; otherwise, outputting error information and quitting the installation;

Step S10, sending a third instruction to the card by the card connector;

Step S11, receiving the third instruction, reading a first computing result of the third instruction, and comparing the first computing result of the third instruction with a second computing result of the third instruction computed by the third instruction, by the card; if they are identical, sending a third success response status code to the card connector and going to Step S12; while if they are not identical, sending a third failure response status code to the card connector and quitting the installation;

Step S12, determining whether a next third instruction is read successfully by the card connector, if yes, returning to Step S10; otherwise, going to Step S13;

Step S13, determining whether an activating instruction is executed successfully by the card connector, if yes, going to Step S14; otherwise, quitting the installation;

Step S14, determining whether a fourth instruction is read successfully by the card connector, if yes, going to Step S15; otherwise, quitting the installation;

Step S15, sending the fourth instruction to the card by the card connector;

Step S16, receiving the fourth instruction, executing a corresponding operation, and sending a fourth response status code to the card connector by the card; and Step S17, determining whether the fourth response status code is identical to a preset value by the card connector, if yes, sending an application to the card; while if no, quitting the installation.

2. The method of claim 1, wherein generating a first session key in Step A2 comprises:

generating a first derivative data with the serial counting value, a first constant and a preset constant, and encrypting the first derivative data with a built-in first key by a specified method so as to generate the first session key by the card;

generating a second session key by the card comprises: generating a second derivative data with the serial counting value, a second constant and the preset constant, and encrypting the second derivative data with a built-in second key by a specified method, so as to generate the second session key by the card;

generating a first data block with the host inquiring code, the serial counting value and the card inquiring code comprises: converging the host inquiring code, the serial counting value, the card inquiring code and the first constant one by one so as to obtain the first data block; and encrypting the first data block with the first session key comprises: encrypting the first data block with the first session key by a specified method.

3. The method of claim 1, wherein authenticating instruction in Step A3 comprises: an instruction, which is constructed by the card connector, including the internal initialization response and taking specified bytes as a data header;

generating a third session key comprises: generating a third derivative data with the serial counting value, the first constant and the preset constant, and encrypting the third derivative data with the built-in first key by a specified method so as to generate the third session key by the card connector;

generating a fourth session key by the card connector comprises:

generating a fourth derivative data with the serial counting value, a second constant and the preset constant, and encrypting the fourth derivative data with a built-in second key by a specified method so as to obtain the fourth session key, by the card connector;

generating a second data block with the host inquiring code, the serial counting value and the card inquiring code comprises: converging the host inquiring code, the serial counting value, the card inquiring code and a first variable one by one so as to obtain the second data block; and encrypting the second data block with a third session key comprises: encrypting the second data block with the third session key by a specified method.

4. The method of claim 1, wherein generating a third data block with the host inquiring code, the serial counting value and the card inquiring code by the card connector in Step A4 comprises: converging the serial counting value, the card inquiring code, the host inquiring code and the first variable one by one so as to obtain the third data block; and encrypting the third data block with the third session key comprises: encrypting the third data block with the third session key by a specified method.

5. The method of claim 1, wherein generating a fourth data block with the host inquiring code, the serial counting value and the card inquiring code by the card in Step A5 comprises: converging the serial counting value, the card inquiring code, the host inquiring code and the first variable one by one so as to obtain the fourth data block; and encrypting the fourth data block with the first session key comprises: encrypting the fourth data block with the first session key by a specified method.

6. The method of claim 1, wherein determining whether the application requested for installation is available by the card connector in Step A7 comprises: determining whether the application requested for installation is available according to a specified character in the instruction of request for installing an application by the card connector.

7. The method of claim 1, wherein the first instruction in Step S1 is the first instruction pointed to by a first operation instruction.

8. The method of claim 7, wherein reading the first instruction comprises: computing the first instruction with the fourth session key and the card connector information value so as to obtain the first computing result of the first instruction, and adding the first computing result of the first instruction to the right side of the first instruction so as to form a new first instruction;

encrypting a data field of the first instruction with the third session key by a specified method, replacing an original part of the data field of the first instruction with an encrypted result so as to obtain a final first instruction.

9. The method of claim 1, wherein reading the first computing result of the first instruction and comparing the first computing result of the first instruction with the second computing result of the first instruction by the card in Step S3 comprises: reading the last 8 bytes of the first instruction so as to obtain the first computing result of the first instruction, decrypting a data field of the first instruction with the first session key by a specified method, replacing the original part of the data field of the first instruction with the encrypted result, computing a specified part of the first instruction with the second session key and the card information value so as to obtain the second computing result of the first instruction, and comparing the first computing result of the first instruction with the second computing result of the first instruction.

10. The method of claim 1, wherein before Step S5, the method comprises determining whether a first file pointed to by a second operation instruction is available, if yes, going to Step S5; otherwise, outputting error information and quitting the installation.

11. The method of claim 1, wherein the second instruction in Step S5 is the second instruction pointed to by the first file and a third operation instruction.

12. The method of claim 11, wherein reading the second instruction comprises computing the second instruction with the fourth session key and the card connector information value so as to obtain the first computing result of the second instruction, adding the first computing result of the second instruction to the right side of the second instruction so as to form a new second instruction, encrypting a data field of the second instruction with the third session key by a specified method, and replacing the original part of the data field of the second instruction with the encrypted result so as to obtain a final second instruction.

13. The method of claim 1, wherein reading a first computing result of the second instruction from the second instruction, and comparing the first computing result of the second instruction with a second computing result of the second instruction by the card comprises reading the last 8 bytes of the second instruction so as to obtain the first computing result of the second instruction, decrypting a data field of the second instruction with the first session key by a specified method, replacing the original part of the data field of the second instruction with the decrypted result, computing a specified part of the second instruction with the second session key and the card information value so as to obtain the second computing result of the second instruction, and comparing the first computing result of the second instruction with the second computing result of the second instruction.

14. The method of claim 1, wherein before Step S9, the method further comprises determining whether a second file pointed to by a fourth operation instruction is available by the card connector, if yes, going to Step S9; otherwise, outputting error information and quitting the installation.

15. The method of claim 1, wherein the third instruction in Step S9 is a third instruction pointed to by a second file and a fifth operation instruction.

16. The method of claim 15, wherein reading the third instruction comprises computing the third instruction with the fourth session key and the card connector information value so as to obtain the first computing result of the third instruction, adding the first computing result of the third instruction to the right side of the third instruction so as to form a new third instruction, encrypting a data field of the third instruction with the third session key by specified method, and replacing the original part with the encrypted result so as to obtain a final third instruction.

17. The method of claim 1, wherein reading a first computing result of the third instruction and comparing the first computing result of the third instruction with a second computing result of the third instruction computed by the third instruction by the card in Step S11 comprises reading the last 8 bytes of the third instruction so as to obtain the first computing result of the third instruction, decrypting a data field of the third instruction with the first session key by a specified method, replacing the original part with the decrypted result, computing a specified part of the third instruction with the second session key and the card information value so as to obtain the second computing result of the third instruction, and comparing the first computing result of the third instruction with the second computing result of the third instruction.

18. The method of claim 1, wherein before Step S13, the method comprises determining whether a next first file pointed to by the second operation instruction by the card connector is available, if the next first file pointed to by the second operation instruction by the card connector is available, if yes, returning to Step S5; otherwise, going to Step S13.

19. The method of claim 1, wherein determining whether an activating instruction is executed successfully by the card connector in Step S13 comprises determining whether the times of the available activation is larger than 0, if yes, executing the activation operation and deducting 1 from the times of available activation; otherwise, quitting the installation.

20. A method of safely downloading an application, characterized in that said method comprises:

Step A1, generating a host inquiring code and storing the host inquiring code by a card connector, sending an internally initializing instruction including the host inquiring code to a card by the card connector;

Step A2, receiving the internally initializing instruction and reading the host inquiring code from the internally initializing instruction by the card, generating and storing a card inquiring code, a first session key and a second session key by the card, generating a first data block with the host inquiring code, a serial counting value and the card inquiring code, and encrypting the first data block with the first session key, so as to obtain a first encryption result by the card;

sending an internal initialization response including the first encryption result, the card inquiring code and the serial counting value to the card connector by the card;

Step A3, receiving the internal initialization response and reading the first encryption result, the card inquiring code, and the serial counting value from the internally initializing instruction by the card connector, executing an authenticating instruction including the internal initialization response by the card connector, generating a third session key and a fourth session key and storing the third session key and the fourth session key by the card connector, generating a second data block with the host inquiring code, the serial counting value and the card inquiring code by the card connector; encrypting the second data block with the third session key so as to obtain a second encryption result, and comparing the second encryption result with the first encryption result by the card connector, if they are identical, going to Step A4; while if they are not identical, outputting error information, and quitting the installation;

Step A4, generating a third data block with the host inquiring code, the serial counting value and the card inquiring code by the card connector; encrypting the third data block with the third session key so as to obtain a third encryption result by the card connector; taking the third encryption result as a part of the authentication data, and computing the authentication data with the fourth session key and a card connector information value so as to obtain a card connector computing result by the card connector; sending an external authenticating instruction including the authentication data and the card connector computing result to the card by the card connector;

Step A5, receiving the external authenticating instruction and reading the authentication data and the card connector computing result from the external authenticating instruction by the card; reading a third encryption result from the authentication data, generating a fourth data block with the host inquiring code, the serial counting value and the card inquiring code by the card connector, encrypting the fourth data block with the first session key so as to obtain a fourth encryption result, and comparing the fourth encryption result with the third encryption result by the card; if they are identical, going to Step A6; while if they are not identical, sending error information and quitting the installation;

Step A6, computing the authentication data with the second session key and a card information value and comparing the obtained card computing result with the card connector computing result by the card, if they are identical, sending an external authentication success response to the card connector by the card and going to Step A7; while if they are not identical, sending error information and quitting the installation;

and

Step A7, determining whether the application requested for installation is available, if yes, going to Step B1; otherwise, quitting the installation; and Step B1, receiving an instruction and determining the type of the instruction by a card;

if the instruction is an internally initializing instruction, going to Step B2;

if the instruction is an external authenticating instruction, going to Step B3;

if the instruction is a first instruction, going to Step B5;

if the instruction is a second instruction, going to Step B6;

if the instruction is a third instruction, going to Step B7;

if the instruction is another instruction, executing a corresponding operation according to the another instruction and returning to Step B1;

Step B2, reading a host inquiring code from the internally initializing instruction by the card, generating and storing a card inquiring code, a first session key and a second session key, generating a first data block, encrypting the first data block so as to obtain a first encryption result by the card, and sending an internal initialization response to the card connector and returning to Step B1;

Step B3, reading an authentication data and a card connector computing result from the external authenticating instruction by the card, reading a third encryption result from the authentication data, generating a fourth data block by the card, encrypting a fourth data block so as to obtain a fourth encryption result, and comparing the fourth encryption result with the third encryption result by the card, if they are identical, going to Step B4; while if they are not identical, sending error information to the card connector and going to Step B1;

Step B4, computing the authentication data by the card so as to obtain a card computing result, comparing the card computing result with the card connector computing result by the card, if they are identical, sending an external authentication success response status code to the card connector and returning to Step B1; while if they are not identical, sending an external authentication failure response status code to the card connector and returning to Step B1;

Step B5, reading a first computing result of the first instruction from the first instruction by the card, decrypting the first instruction, replacing the original part with the decrypted result, computing the first instruction so as to obtain a second computing result of the first instruction by the card, comparing the second computing result of the first instruction with the first computing result of the first instruction by the card, if they are identical, sending a first success response status code to the card connector and returning to Step B1; while if they are not identical, sending a first failure response status code to the card connector and returning to Step B1;

Step B6, reading a first computing result of the second instruction from the second instruction by the card, decrypting the second instruction, replacing the original part with the decrypted result, computing the second instruction so as to obtain a second computing result of the second instruction, and comparing the second computing result of the second instruction with the first computing result of the second instruction, if they are identical, sending a second success response status code to the card connector and returning to Step B1, while if they are not identical, sending a second failure response status code to the card connector and returning to Step B1;

and

Step B7, reading a first computing result of the third instruction from the third instruction, decrypting the third instruction, replacing the original part with the decrypted result, computing the third instruction so as to obtain a second computing result of the third instruction, and comparing the second computing result of the third instruction with the first computing result of the third instruction, if they are identical, sending a third success response status code to the card connector and returning to Step B1; while if they are not identical, sending a third failure response status code to the card connector and returning to Step B1.

21. The method of claim 20, wherein generating a first session key in Step B2 comprises generating a first derivative data with a serial counting value, a first constant and a preset constant and encrypting the first derivative data with a built-in first key by a specified method so as to obtain the first session key by the card;

generating a second session key by the card comprises generating a second derivative data with a serial counting value, a second constant and a preset constant, encrypting the second derivative data with a built-in second key by a specified method by the card so as to obtain the second session key;

generating a first data block comprises converging the host inquiring code, the serial counting value, the card inquiring code and a first variable one by one so as to obtain the first data block;

encrypting the first data block comprises encrypting the first data block with the first session key by a specified method; and the internal initialization response sent to the card connector is an internal initialization response including the first encryption result, the card inquiring code and the serial counting value.

22. The method of claim 20, wherein generating a fourth data block in Step B3 comprises converging the serial counting value, the card inquiring code, the host inquiring code and the first variable one by one so as to form the fourth data block;

encrypting the fourth data block comprises encrypting the fourth data block with the first session key by a specified method.

23. The method of claim 20, wherein computing the authentication data in Step B4 comprises computing the authentication data with the second session key and the card information value by the card.

24. The method of claim 20, wherein decrypting in Step B5 or Step B6 or Step B7 comprises decrypting a data field of the instruction with the first session key in a specified method by the card; and computing the instruction comprises computing a specified part of the instruction with the second session key and the card information value.

25. A method for safely downloading an application, characterized in that said method comprises:

Step A1, generating a host inquiring code and storing the host inquiring code by a card connector, sending an internally initializing instruction including the host inquiring code to a card by the card connector;

Step A2, receiving the internally initializing instruction and reading the host inquiring code from the internally initializing instruction by the card, generating and storing a card inquiring code, a first session key and a second session key by the card, generating a first data block with the host inquiring code, a serial counting value and the card inquiring code, and encrypting the first data block with the first session key, so as to obtain a first encryption result by the card;

sending an internal initialization response including the first encryption result, the card inquiring code and the serial counting value to the card connector by the card;

Step A3, receiving the internal initialization response and reading the first encryption result, the card inquiring code, and the serial counting value from the internally initializing instruction by the card connector, executing an authenticating instruction including the internal initialization response by the card connector, generating a third session key and a fourth session key and storing the third session key and the fourth session key by the card connector, generating a second data block with the host inquiring code, the serial counting value and the card inquiring code by the card connector; encrypting the second data block with the third session key so as to obtain a second encryption result, and comparing the second encryption result with the first encryption result by the card connector, if they are identical, going to Step A4; while if they are not identical, outputting error information, and quitting the installation;

Step A4, generating a third data block with the host inquiring code, the serial counting value and the card inquiring code by the card connector; encrypting the third data block with the third session key so as to obtain a third encryption result by the card connector; taking the third encryption result as a part of the authentication data, and computing the authentication data with the fourth session key and a card connector information value so as to obtain a card connector computing result by the card connector; sending an external authenticating instruction including the authentication data and the card connector computing result to the card by the card connector;

Step A5, receiving the external authenticating instruction and reading the authentication data and the card connector computing result from the external authenticating instruction by the card; reading a third encryption result from the authentication data, generating a fourth data block with the host inquiring code, the serial counting value and the card inquiring code by the card connector, encrypting the fourth data block with the first session key so as to obtain a fourth encryption result, and comparing the fourth encryption result with the third encryption result by the card; if they are identical, going to Step A6; while if they are not identical, sending error information and quitting the installation;

Step A6, computing the authentication data with the second session key and a card information value and comparing the obtained card computing result with the card connector computing result by the card, if they are identical, sending an external authentication success response to the card connector by the card and going to Step A7; while if they are not identical, sending error information and quitting the installation; and Step A7, determining whether the application requested for installation is available, if yes, going to Step C1; otherwise, quitting the installation; and Step C1, waiting for receiving an internally initializing instruction and determining whether the internally initializing instruction is received by a card, if yes, going to Step C2; otherwise, returning to Step C1;

Step C2, reading a host inquiring code from the internally initializing instruction by the card, generating a card inquiring code, a first session key and a second session key so as to obtain a first data block by the card, encrypting the first data block so as to obtain a first encryption result, and sending the internally initializing response to the card connector by the card, and going to Step C3;

Step C3, waiting for receiving an external authenticating instruction and determining whether the external authenticating instruction is received by the card, if yes, going to Step C4; otherwise, returning to Step C3;

Step C4, reading the authentication data and a card connector computing result from the external authenticating instruction by the card, reading a third encryption result from the authentication data so as to obtain a fourth data block by the card, encrypting the fourth data block so as to obtain a fourth encryption result, and comparing the fourth encryption result with the third encryption result by the card, if they are identical, going to Step C5; while if they are not identical, sending error information to the card connector;

Step C5, computing the authentication data so as to obtain a card computing result by the card, comparing the card computing result with the card connector computing result, if they are identical, sending an external authentication success response status code to the card connector and going to Step C6; while if they are not identical, sending an external authentication failure response status code to the card connector;

Step C6, waiting for receiving a first instruction, and determining whether the first instruction is received by the card, if yes, going to Step C7; otherwise, returning to Step C6;

Step C7, reading a first computing result of the first instruction from the first instruction by the card, decrypting the first instruction, replacing the original part with the decrypted result by the card, computing the first instruction so as to obtain a second computing result of the first instruction, and comparing the second computing result of the first instruction with the first computing result of the first instruction by the card, if they are identical, sending a first success response status code to the card connector and going to Step C8; while if they are not identical, sending a first failure response status code to the card connector;

Step C8, waiting for receiving a second instruction, and determining whether the second instruction is received by the card, if yes, going to Step C9; otherwise, returning to Step C8;

Step C9, reading a first computing result of the second instruction from the second instruction by the card, decrypting the second instruction, replacing the original part with the decrypted result, computing the second instruction so as to obtain a second computing result of the second instruction, and comparing the second computing result of the second instruction with the first computing result of the second instruction by the card, if they are identical, sending a second success response status code to the card connector and going to Step C10; while if they are not identical, sending a second failure response status code to the card connector;

Step C10, waiting for receiving a third instruction, and determining whether the third instruction is received by the card, if yes, going to Step C11; otherwise, returning to Step C10;

Step C11, reading a first computing result of the third instruction from the third instruction by the card, decrypting the third instruction, replacing the original part with the decrypted result, computing the third instruction so as to obtain a second computing result of the third instruction, and comparing the second computing result of the third instruction with the first computing result of the third instruction by the card, if they are identical, sending a third success response status code to the card connector and going to Step C12; while if they are not identical, sending a third failure response status code to the card connector; and Step C12, waiting for receiving a fourth instruction, and determining whether the fourth instruction is received by the card, if yes, executing the fourth instruction and waiting for receiving the application; otherwise, returning to Step C12.

26. The method of claim 25, wherein generating a first session key in Step C2 comprises generating a first derivative data with a serial counting value, a first constant and a preset constant, and encrypting the first derivative data with a built-in first key by a specified method so as to obtain the first session key by the card;

generating a second session key by the card comprises generating a second derivative data with the serial counting value, a second constant and the preset constant, and encrypting the second derivative data with a built-in second key by a specified method so as to obtain the second session key;

generating a first data block comprises converging the host inquiring code, the serial counting value, the card inquiring code and the first variable one by one so as to form the first data block;

encrypting the first data block comprises encrypting the first data block with the first session key by a specified method; and the internal initialization response sent to the card connector is an internal initialization response including the first encryption result, the card inquiring code and the serial counting value.

27. The method of claim 25, wherein generating a fourth data block in Step C4 comprises converging the serial counting value, the card inquiring code, the host inquiring code and the first variable one by one so as to form the fourth data block; and encrypting the fourth data block comprises encrypting the fourth data block with the first session key by specified method.

28. The method of claim 25, wherein computing the authentication data in Step C5 comprises computing the authentication data with the second session key and a card information value.

29. The method of claim 25, wherein decrypting in Step C7 or Step C9 or Step C11 comprises decrypting a data field of the instruction with the first session key in a specified method by the card; and computing the instruction comprises computing a specified part of the instruction with the second session key and the card information value.

* * * * *